(No Model.)
H. O. WINSOR.
ANTI-FRICTION BEARING FOR PULLEY BLOCKS.
No. 264,989. Patented Sept. 26, 1882.
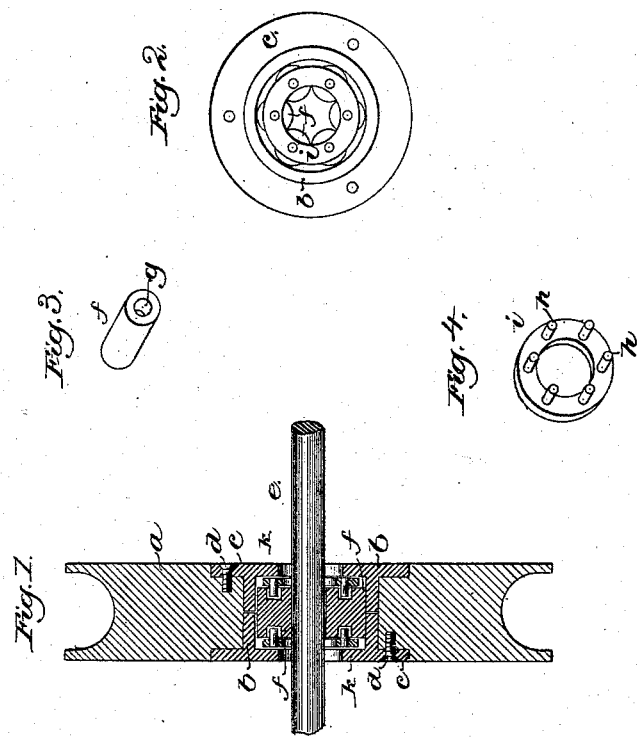
Witnesses.
Inventor:
Henry O. Winsor
by Crosby & Gregory
attys.

UNITED STATES PATENT OFFICE.

HENRY O. WINSOR, OF DUXBURY, MASSACHUSETTS.

ANTI-FRICTION BEARING FOR PULLEY-BLOCKS.

SPECIFICATION forming part of Letters Patent No. 264,989, dated September 26, 1882.

Application filed July 31, 1882. (No model.)

*To all whom it may concern:*

Be it known that I, HENRY OTIS WINSOR, of Duxbury, county of Plymouth, State of Massachusetts, have invented an Improvement in Anti-Friction Bearings for Pulley-Blocks, of which the following description, in connection with the accompanying drawings, is a specification.

My invention relates to an anti-friction bearing especially adapted for sheaves or pulley-blocks, and has for its object to provide a simple, cheap, and durable bearing in which any one of the rollers or other parts may be readily removed when worn or broken and replaced by a perfect one.

The invention is embodied in a bearing consisting of two annular or cylindrical bushings to be inserted in the central opening of the sheave from opposite sides to afford a large cylindrical central bearing concentric with the pivot-pin or axle of the pulley-block, the annular space between the exterior of the said axle and the interior of the said bushing being occupied by a series of cylindrical rollers provided with axial sockets at each end to receive a series of pins fixed upon an annular collar, by means of which the said rollers are maintained in proper relative position and prevented from grinding upon one another as they revolve in the space between the axle and bushing of the sheave. The pins of the said collar fit loosely in the said sockets, and the rollers fit loosely in the space between the axle and bushing, which is provided with flanges for attaching it to the sheave, and also for preventing the rollers from sliding longitudinally from their operative position, the said parts thus being retained together in proper relative position only by the attachment of the bushing to the sheave, so that when either portion of the said bushing is renewed any one or all of the other parts of the bearing can be readily removed and one or more new parts inserted.

Figure 1 is a vertical section of a sheave and axle provided with an anti-friction bearing in accordance with this invention; Fig. 2, a side elevation of the bearing, one of the bushings being removed; and Figs. 3 and 4, details showing in perspective one of the rollers and the collar by which they are held in the proper relative position.

The sheave $a$ is provided with two similar bushings, $b$, having flanges $c$, by which they may be attached to the sheave $a$ by means of screws or rivets $d$. The said bushing $b$ thus affords a large central cylindrical bearing-surface concentric with the cylindrical pivot-pin or axle $e$ of the pulley-block. The annular space between the said bushing or bearing-surface $b$ and axle $e$ is occupied by a series of cylindrical anti-friction rollers, $f$, having short axial sockets $g$ at either end, adapted to receive loosely within them a series of pins, $h$, carried by a collar, $i$, encircling the axle $e$ at each end of the rollers $f$. The said series of rollers and their collars $i$ are kept in place between the axle $e$ and bushing $b$ by the flanges $k$ from the said bushing, and when one of the said bushings is removed from the sheave $a$ by detaching the flange $c$ therefrom any one or all of the loose internal parts, $f\ i$, of the bearing may be removed longitudinally and replaced by others, thus making the bearing very easily repaired, besides its being extremely durable and unlikely to be broken.

A few duplicate parts will usually be carried on shipboard; but the internal parts of the bearing are so simple in construction that they can readily be made from the materials and by the tools usually at hand in an ordinary vessel.

It is obvious that the bearing may be applied to wheels or other rotated objects, although in the precise form shown it is especially adapted for a pulley-block.

I am aware that anti-friction bearings for sheaves have been heretofore employed consisting of bushings, anti-friction rollers, and collars at the ends of the said rollers; but in such bearings, so far as I am aware, the collars at the ends of the rollers have been connected together by riveted pins, either passing through and forming the axis of the rollers or passing between the rollers; and in such construction it is impossible to remove any one of the rollers or either of the collars without destroying the riveting which connects the said collars, and the parts cannot be put together again without similarly connecting the said collars, all of which is obviated by my invention, in which the collars are wholly independent of and disconnected from one another, and are held in place merely by the flanges of the bushings.

I claim—

The combination, with the sheave, pulley, or wheel $a$, of the similar bushings, $b$, provided with flanges $c\ k$, and adapted to be attached to either side thereof, and the series of antifriction rollers provided with axial sockets at their ends, and the independent collars at each end of the said rollers, provided with pins entering the said sockets, the said rollers and collars being held in place by the flanges $k$ of the bushing, substantially as described.

In testimony whereof I have signed my name to this specification in the presence of two subscribing witnesses.

HENRY O. WINSOR.

Witnesses:
 JOS. P. LIVERMORE,
 W. H. SIGSTON.